United States Patent [19]

Fong et al.

[11] Patent Number: 4,546,156

[45] Date of Patent: * Oct. 8, 1985

[54] WATER-SOLUBLE SULFONATED POLYMERS

[75] Inventors: Dodd W. Fong, Naperville; David J. Kowalski, LaGrange Park, both of Ill.

[73] Assignee: Nalco Chemical Company, Oak Brook, Ill.

[ * ] Notice: The portion of the term of this patent subsequent to Dec. 25, 2001 has been disclaimed.

[21] Appl. No.: 643,515

[22] Filed: Aug. 23, 1984

Related U.S. Application Data

[62] Division of Ser. No. 509,549, Jun. 30, 1983, Pat. No. 4,490,308.

[51] Int. Cl.$^4$ .............................................. C08F 28/02
[52] U.S. Cl. .................................. 526/240; 526/241; 526/287
[58] Field of Search ........................ 526/240, 241, 287

[56] References Cited

U.S. PATENT DOCUMENTS 4,462,808  7/1984  Gross .................................. 526/287

Primary Examiner—Christopher A. Henderson
Attorney, Agent, or Firm—John G. Premo; Donald G. Epple

[57] ABSTRACT

Novel water-soluble polymers and copolymers are synthesized by the free radical polymerization of vinyl addition monomers described generally by the formula:

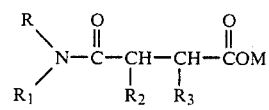

wherein:
M is hydrogen, lithium, sodium, potassium, ammonium, magnesium, or calcium;
R is allyl or methallyl;
$R_1$ is hydrogen, allyl or methallyl;
$R_2$ is hydrogen or sulfonato:
$R_3$ is hydrogen or sulfonato; and providing that $R_2$ is not the same as $R_3$.

12 Claims, No Drawings

WATER-SOLUBLE SULFONATED POLYMERS

This application is a divisional application from our originally filed patent application Ser. No. 509,549, filed June 30, 1983, U.S. Pat. No. 4,490,308, currently pending before the Patent and Trademark Office.

INTRODUCTION

Water soluble sulfonated monomers are of great importance. However, only a few such monomers are commercially available domestically. These are 2-acrylamidomethylpropane sulfonic aicd (AMPS), sodium vinyl sulfonate, sulfoethylmethacrylate, and styrene sulfonate. These monomers suffer at least one of the following drawbacks: moderately expensive, variable quality, unfavorable reactivity ratios with other water soluble vinyl monomers, and/or easily hydrolyzable.

Another approach to sulfonated polymers is to sulfonate an existing polymer. This approach has been commercialized, however, the sulfonation process may be incompatible with other functional groups one desires to be incorporated within the polymer.

Therefore, if one could develope a new water soluble sulfonated monomer for incorporation into water soluble polymers, one would have contributed to the advance of the art of water soluble monomers and polymers.

THE INVENTION

We have invented an anionic monomer capable of homopolymerization and copolymerization which is represented by the chemical formula:

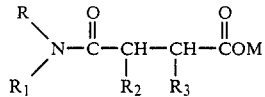

wherein: M is chosen from the group consisting of hydrogen, lithium, sodium, potassium, ammonium, magnesium, and calcium; R and $R_1$ are chosen from the group consisting of hydrogen, allyl, and methallyl, providing that when R is hydrogen, $R_1$ is either allyl or methallyl; and wherein $R_2$ and $R_3$ are chosen from the group consisting of hydrogen or sulfonato substitution, providing that $R_2$ and $R_3$ can never be the same.

A preferred anionic monomer is given by the formula:

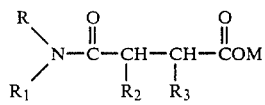

wherein: R is the allyl group, $R_1$ is hydrogen, $R_2$ is hydrogen, $R_3$ is the sulfonato group, and M is chosen from the group consisting of hydrogen, lithium, sodium, ammonium, potassium, magnesium, and calcium.

Another preferred anionic monomer would be represented by the chemical formula:

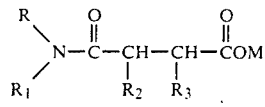

wherein: R and $R_1$ are both allyl groups, $R_2$ is hydrogen, and $R_3$ is the sulfonato group, with M being chosen from the group consisting of hydrogen, lithium, sodium, potassium, ammonium, magnesium, and calcium.

Similarly, we have discovered anionic monomers represented by the chemical formula:

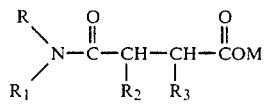

wherein: R is the allyl group, $R_1$ is hydrogen, $R_2$ is the sulfonato group, $R_3$ is hydrogen, and M is from the group consisting of hydrogen, lithium, sodium, potassium, ammonium, magnesium, and calcium.

Similarly, the anionic monomers described by the above formula may also exist wherein R and $R_1$ are both allyl groups, $R_2$ is the sulfonato group, $R_3$ is hydrogen and M is again represented by the group hydrogen, lithium, sodium, ammonium, potassium, magnesium, and calcium.

The preferred anionic monomers which are capable of homopolymerization and copolymerization with water soluble vinyl monomers are represented by the formula:

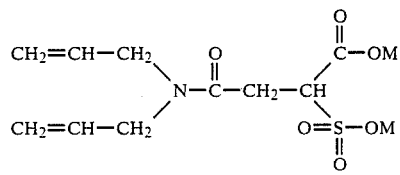

wherein: M is chosen from the group consisting of hydrogen, lithium, sodium, potassium, and ammonium.

Similarly, another preferred anionic monomer which is capable of homopolymerization and copolymerization with water soluble vinyl monomers is represented by the formula:

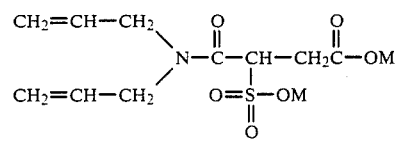

wherein: M is chosen from the group consisting of hydrogen, lithium, sodium, potassium, and ammonium.

Likewise, another preferred anionic monomer which is capable of homopolymerization and copolymerization with water soluble vinyl monomers is represented by the formula:

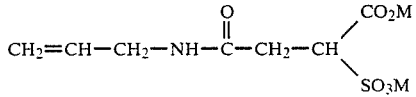

wherein: M is chosen from the group consisting of hydrogen, lithium, sodium, ammonium, and potassium.

SYNTHESIS

The above cited monomers are prepared by generally reacting maleic anhydride with the preferred amine compound. The solution may be used directly for the next reaction or the product may be isolated. The product of the above reaction is allowed to react with sodium sulfite or sodium bisulfite under conditions which will yield a sulfonato group addition across the carboxylate influenced carbon to carbon double bond. The reaction conditions are preferably kept at relatively low temperatures and the addition of bisulfite or sulfite across the carbon-carbon double bond is normally spontaneous. By way of example, the following synthesis of monomer precursors and monomers are presented:

(A) N,N-Diallylmaleamic acid (I).

Maleic anhydride (100 g, 1.02 mol) was dispersed in 400 mL toluene at 40° C. Diallylamine (97% pure, 100 g, 1.00 mol) was added over a period of 30 minutes with cooling so that the reaction temperature was maintained below 40° C. After addition, the reaction mixture was stirred at room temperature for 3 hours. The IR of the reaction mixture showed the absence of the anhydride. A nearly quantitative conversion was obtained. The Carbon-13 data is shown in Table 1.

(B) N,N-Diallylmaleamic acid, sodium salt (III).

The toluene solution from A was extracted with 15.6% NaOH solution (257 mL, 1 mol). IR of the toluene phase after extraction showed no residual amide. The Carbon-13 data is shown in Table 1.

(C) 3-Carboxy-3-sulfo-N,N-diallylpropionamide (VI).

To a solution of $NaHSO_3$ (104 g, 1 mol) in 208 g of water was added under nitrogen an aqueous solution of sodium N,N-diallylmaleamate (solution from B, 1 mol) with stirring. The temperature of the reaction mixture was maintained below 55° C. with cooling. After addition, the reaction mixture was kept under nitrogen at room temperature overnight.

To a solution of $Na_2SO_3$ (19 g, 0.15 mol) in 88 g of water was added under nitrogen a solution of N,N-diallylmaleamic acid (26.8 g, 0.138 mol) in toluene (55.7 g) with stirring. The reaction mixture was stirred for five hours and then allowed to stand. The layers separated and the toluene layer was discarded. Typical carbon data is presented in Table 1.

(D) Sodium N,N-diallylmaleamate (III) and sodium N,N-diallylfumaramate (II).

Maleic anhydride (100 g, 1.02 mol) was dispersed in 400 g of toluene at 40° C. Diallylamine (97% pure, 100 g, 1 mol) was added with stirring. The temperature of the reaction mixture rose to 81° C. After addition, the reaction mixture was heated to reflux for 10 hours. The toluene solution was extracted with 16.7% NaOH solution (240 mL, 1 mol). The carbon data for a mixture of III and II is presented in Table 1.

(E) 3-Carboxy-3-sulfo-N,N-diallylpropionamide (VI) and 3-carboxy-2-sulfo-N,N-diallylpropionamide (VII.)

To a solution of sodium bisulfite (104 g, 1 mol) in 250 g of water was added under nitrogen a solution of sodium N,N-diallylmaleamate and sodium N,N-diallylfumaramate (217 g, 1 mol) in 300 g of water. The temperature of the reaction mixture was maintained at 50° C. for 12 hours. The carbon data for this mixture is presented in Table 1.

(F) N-Allylmaleamic acid (VIII).

To a solution of maleic anhydride (98 g, 1 mol) in 400 mL THF was added with stirring allylamine (98% pure, 58.5 g, 1 mol) at a temperature below 40° C. Precipitates formed during amine addition. After addition, the reaction mixture was stirred at ambient temperature for 1.5 hours and then heated to reflux for 4 hours. A homogeneous solution formed at temperatures above 45° C. At room temperature, white crystals (112 g) precipitated from the solution were isolated by filtration. On evaporation of the filtrate, about 50 g of solid was obtained. The carbon data for the salt form of VIII is presented in Table 1.

(G) 3-Carboxy-3-sulfo-N-allylpropionamide (IX).

Sodium bisulfite (104 g, 1 mol), water (200 g, and N-allylmaleamic acid (112 g, 0.72 mol) were combined and stirred under nitrogen at 55° C. for 3 hours. The carbon data for the acidified form of IX is presented in Table 1.

(H) N-Allyl-sulfo-succinimide (X).

3-Carboxy-3-sulfo-N-allylpropionamide (20 g) was heated neat in an oil bath at 160°-170° C. for 10 hours. The IR is consistent with imide formation. The carbon data is presented in Table 1.

Each of the products of the above examples were analyzed by Carbon-13 NMR, Proton NMR and Infrared Spectroscopy techniques.

The infrared spectra were obtained on a Beckman AccuLab 8 Infrared Spectrometer. The samples to be analyzed were cast on a silver chloride plate and the solvent was evaporated prior to the infrared spectrographic analysis. The Joel FX-90Q Nuclear Magnetic Resonance Spectrometer was used to obtain the proton and carbon spectra. Solution concentration of the products range from 5–50% and the solvents were either water, $D_2O$, toluene, or deuterochloroform. An external capillary containing tetramethylsilane (TMS, 0.0δ) in deuterochloroform was used as an external standard for most of the Carbon-13 spectra. An external $D_2O$ signal was used for lock. A flip angle of 45° and a delay time between pulses of generally 4 seconds was used to obtain the Carbon 13 spectra. A flip angle of 45° and a delay time between pulses of 10 seconds was used for the proton spectra. The carbon spectra were obtained using a sweep width of 6000 HZ while a 1000 HZ sweep was used for the proton spectra. Table 1 presents the Carbon 13 NMR data obtained for the intermediate compounds and the various sulfonated monomers.

TABLE 1

| Compound | Solvent | Reference Signal | Carbonyl Absorptions | Olefinic =C\H | Olefinic =CH$_2$ | Succinyl —CH | Allylic —CH$_2$ | Succinyl —CH$_2$ |
|---|---|---|---|---|---|---|---|---|
| I[a] | toluene | internal TMS | 167.6 166.3 | 133.1 132.6 131.9 131.6 | 118.0 117.4 | | 50.5 48.1 | |
| III[b] | H$_2$O, pH = 9.6 | toluene methyl = 21.45 | 173.1 170.5 | 134.5 133.9 133.5 128.4 | 117.7 117.4 | | 50.9 47.5 | |
| VI[c] | H$_2$O, pH = 9.6 | external TMS | 174.6 173.5 | 133.8 | 118.1 | 66.1 | 51.1 49.5 | 34 |
| IV[d] | H$_2$O, pH < 1 | external TMS | 172.3 171.8 | 133.2 | 117.9 | 63.1 | 51.0 49.6 | 33.4 |
| II$_S$[e] | H$_2$O, pH ~ 10 | external TMS | 172.8 168.1 | 138.4 132.9 132.3 129.3 | 117.6 117.4 | | 50.4 49.0 | |
| mixture of III[b] & II[e] | H$_2$O, IPA present pH ~ 9 | external TMS | 173.4 173.0 170.6 168.0 | 140.0 134.6 133.7 133.3 129.0 128.1 | 118.0 117.6 | | 51.2 50.3 49.0 47.8 | |
| mixture of VI[c] & VII[f] | H$_2$O, pH = 7 | external TMS | 178.4 174.3 173.0 170.0 | 133.7 133.4 133.1 | 118.6 177.7 | 65.6 (VI) 59.6 (VII) | 51.5 50.6 49.0 | 37.8 (VII) 33.6 (VI) |
| VIII$_S$[g] | H$_2$O, pH ~ 11 | external TMS | 174.5 167.8 | 136.9 134.0 124.6 | 116.2 | | 41.9 | |
| IX[h] | H$_2$O, pH ~ 2 | external TMS | 172.3 171.6 | 134.4 | 116.5 | 62.8 | 42.5 | 35.2 |
| X[i] | H$_2$O, pH ~ 3 | external TMS | 178.3 174.0 | 131.1 | 117.5 | 59.9 | 41.6 | 33.1 |

[a]N,N—diallylmaleamic acid
[b]N,N—diallylmaleamic acid, sodium salt
[c]3-carboxy-3-sulfo-N,N—diallylpropionamide, sodium salt
[d]3-carboxy-3-sulfo-N,N—diallylpropionamide
[e]N,N—diallylfumaramic acid, sodium salt
[f]3-carboxy-2-sulfo-N,N—diallylpropionamide, sodium salt
[g]N—allylmaleamic acid, sodium salt
[h]3-carboxy-3-sulfo-N—allylpropionamide
[i]N—allyl-sulfo-succinimide Prior to continuing to exemplify the formation of homopolymers and copolymers that may be derived by free radical polymerization using the anionic monomers of this invention, a summary of the diallylamine, maleic anhydride and sulfite reactions can assist one in understanding the reaction sequence and products derived therefrom.

Summary of Diallylamine-Maleic Anhydride-Sulfite Reactions $(CH_2=CHCH_2)_2NH +$ [maleic anhydride structure]

↓ Toluene

-continued
Summary of Diallylamine-Maleic Anhydride-Sulfite Reactions

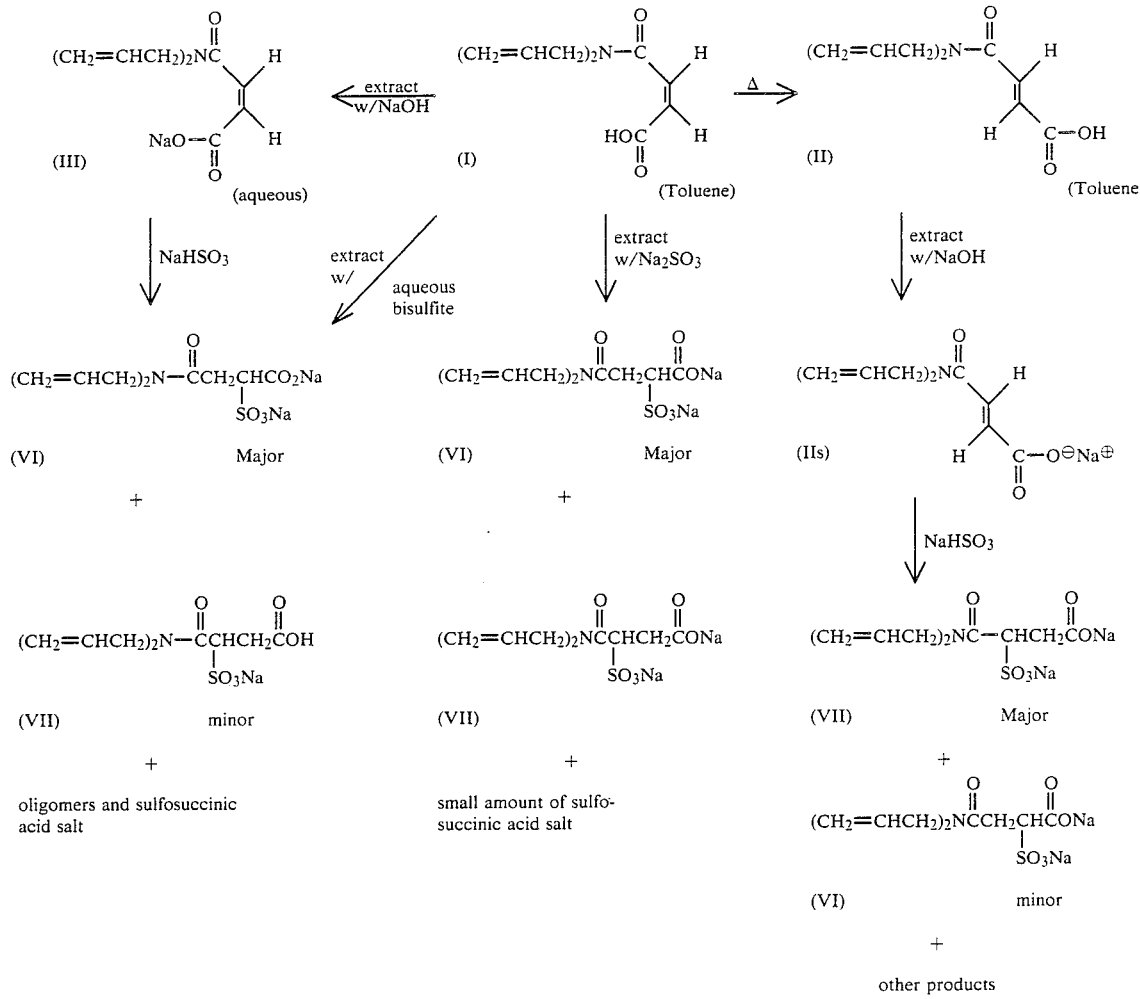

SUMMARY OF REACTION CONDITIONS AND ISOMERIZATION OF PRODUCTS

The reaction of excess diallylamine with maleic anhydride in tetrahydrofuran gave the amide-acid product as well as hydrolyzed maleic anhydride.

Toluene was chosen as an alternate solvent. The initial reaction was performed using 1 mole of diallylamine and 1 mole of triethylamine with 1 mole of maleic anhydride at reflux after the initial exotherm subsided. A homogeneous reaction mixture resulted once the diallylamine was added. The toluene was removed and the C-13 NMR spectrum indicated that most of the triethylamine had been removed. A complicated spectrum was observed. The triethylamine did not seem to be important and subsequent reactions with only a slight excess of diallyamine gave the desired product.

An exotherm had been observed when the diallyamine was added to the maleic anhydride. When a 1:1 mole ratio of diallylamine to maleic anhydride is allowed to react in toluene maintaining the temperature below 40° C., the product is formed in essentially quantitative yield and no evidence for residual maleic anhydride is observed. The reaction is probably over following the exotherm; but the reactions were stirred for several hours at room temperature. When the reaction temperature was kept below 40° C., a simpler carbon spectrum was obtained. This spectrum is interpreted as arising from one isomer that exhibits restricted rotation about the amide bond.

When the reaction between diallylamine and maleic anhydride was kept at reflux for an extended period of time, a much more complicated carbon spectrum was obtained. At reflux, isomerization about the 1,2-disubstituted double bond occurs and this new isomer also possesses restricted rotation about the amide bond. Reactions run at high temperatures exhibit a complicated spectrum because two isomers are present; each possessing restricted rotation behavior.

The questions of which isomer remained to be determined. This was more easily answered from the proton spectrum. The protons of a maleyl double bond absorb at $\sim 6\delta$ while those of the fumaryl double bond absorb at $\sim 6.8\delta$. The product of the reaction of diallylamine with maleic anhydride below 40° C. exhibits a doublet pair centered at $\sim 6\delta$ indicative of the maleyl isomer. The products of the reaction of diallylamine with maleic anhydride after reflux exhibit doublet pairs centered at $\sim 6\delta$ and $\sim 6.8\delta$ indicative of a mixture of the maleyl and fumaryl isomers.

Removal of the product from toluene under mild conditions is desirable. The toluene solution of the low temperature reaction was extracted with a 25% aqueous sodium hydroxide solution giving an aqueous solution containing 40–50% total solids. The extraction efficiency from the toluene is very good since IR data on the toluene phase exhibited no signals from the product. The aqueous extract has an IR spectrum which exhibits a carboxylic acid salt band at 1585 cm$^{-1}$ and a tertiary amide band at 1615 cm$^{-1}$. The C-13 spectrum exhibits signals from extracted toluene and from residual diallylamine. The remainder of the spectrum is consistent with one isomer, N,N-diallylmaleamic acid, sodium salt. The salt form of the other isomer, N,N-diallylfumaramic acid, was generated following extended reflux of the toluene solution and isolated by fractional precipitation.

The reaction of equimolar amounts of diallylamine with maleic anhydride in toluene at temperatures below 40° C. gives a quantitative conversion to the N,N-diallylmaleamic acid (I).

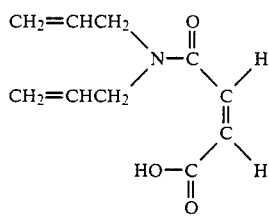
I

This can be base extracted from the toluene solvent into water quantitatively without structural change. If, however, the toluene solution of the initial product is refluxed for a long period of time, the N,N-diallylmaleamic acid is converted to N,N-diallylfumaramic acid (II).

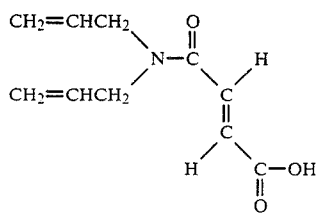
II

This can also be base extracted from the toluene solvent into water without structural change.

THE REACTION BETWEEN N,N-DIALLYLMALEAMIC ACID AND SULFITE REAGENTS

The maleamic acid (I) possesses a reactive double bond that can be sulfonated. Sodium bisulfite is reactive with such double bonds. The reaction gives two products as shown below.

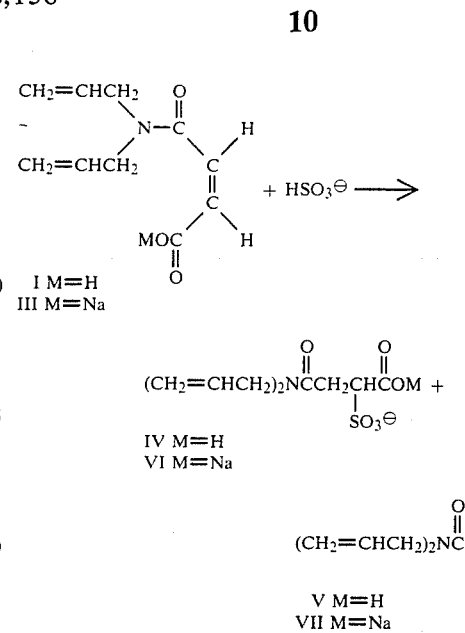

I M=H
III M=Na

IV M=H
VI M=Na

V M=H
VII M=Na

The addition of bisulfite to either an α, β-unsaturated amide or an α, β-unsaturated acid would be expected to be similar. If one starts with III, then isomer VI could be expected to predominate. The addition of bisulfite to an α, β-unsaturated amide would be favored over adding to an α, β-unsaturated acid salt. The maleamic acid is only slightly soluble in water and was shown to be susceptible to acid hydrolysis. For these reasons, the reaction of the salt (III) with bisulfite was studied.

An aqueous solution of sodium bisulfite was allowed to react with an aqueous solution of III. An exothermic reaction ensued; and once it subsided, the sample was heated at 50° C. to complete the reaction. One sample was purified and its C-13 spectrum at a pH of 3 and a pH of 10 was run. This sample was hydrolyzed and by C-13 the decrease in intensities of certain signals parallel the increase in intensities of others. From these spectra and the hydrolysis data, it was concluded that the sample is a mixture of sulfosuccinamate and sulfosuccinate. By comparing the pH dependence of CH carbon signal of the sulfosuccinate to the sulfo-product and the CH$_2$ carbon signal of the sulfosuccinate to the sulfo-product, it was concluded that the carboxylic acid and sulfonic acid functionality are on the same carbon for the product (VI).

The maleamic acid was prepared in toluene at low temperature using equimolar amounts of diallylamine and maleic anhydride. This product was formed in excellent yield as evidenced by the C-13 NMR spectrum. This toluene solution was then extracted with an aqueous sodium bisulfite solution. In one case, the pH of the bisulfite solution had been adjusted with caustic to 7; and in a second experiment, the pH was 12.5. For both of these reactions, the product mixture was substantially cleaner. In addition to the signals from the product, small signals were attributed to unreacted starting material, a small amount of sulfosuccinic acid salt, signals attributed to the other mode of bisulfite addition to the maleamic acid, and a very small amount of oligomerization.

The cleanest product mixture was obtained when an aqueous solution of sodium sulfite was used to extract and convert the maleamic acid to the product at room temperature. In this experiment, the oligomerization was suppressed. Signals from starting material, a small amount of hydrolysis product, and the other isomer are present. It was found that sodium sulfite does not react with the maleamic acid sodium salt.

The sulfo-product from the maleamic acid reaction was subjected to base and acidic conditions to determine its stability. The extent of hydrolysis was determined from C-13 data. After three hours at 90° C. with a pH of 14, moderate hydrolysis to sulfosuccinate occurred. At pH's 10–12 no evidence for hydrolysis was observed at room temperature. At pH's below 2.5, moderate hydrolysis occurred after one week at room temperature.

THE REACTION BETWEEN N,N-DIALLYLFUMARAMIC ACID AND BISULFITE REAGENTS

The fumaramic acid (II) also contains a reactive double bond that can be sulfonated. As for Product I, the reaction between Product II and bisulfite can be expected to give two possible isomers. Conducting the experiment at a basic pH would favor the addition of bisulfite to the α, β-unsaturated amide portion of the molecule.

An aqueous solution of sodium bisulfite was added to an aqueous solution of the sodium salt of II and no exotherm was noted. The sample was then warmed. By C-13 the reaction of bisulfite with the fumaramic acid salt had proceeded. The reaction is much slower than in the case of the maleamic acid; and upon heating to accelerate the reaction, a very complicated carbon spectrum results. The spectrum does exhibit major signals that do not match those of VI. These signals are interpreted to mean that the fumaramic acid salt reacts with bisulfite to give the product resulting from addition to the α, β-unsaturated acid. Whereas this isomer (III) appears to be formed to a small extent in the maleamic acid bisulfite reaction, a small amount of the maleamic acid bisulfite product (VI) appears to be present in this reaction. The sulfonated fumaramic acid is susceptible to hydrolysis. Moderate hydrolysis occurs at room temperature at pHs less than 2.5 over one week.

SUMMARY OF DIALLYLAMINE-MALEIC ANHYDRIDE-SULFITE REACTION

As depicted in the reaction scheme above, diallylamine reacts with maleic anhydride to give N,N-diallylmaleamic acid (I) exclusively when the reaction temperature is kept below 40° C. N,N-Diallylmaleamic acid isomerizes slowly to N,N-diallylfumaramic acid (II) in refluxing toluene. Both (I) and (II) are stable to base, but are readily hydrolyzed under acidic conditions. N,N-Diallylmaleamic acid (I) and sulfite or bisulfite react exothermically to give mainly 3-carboxy-3-sulfo-N,N-diallylpropionamide (VI). On heating, N,N-diallylfumaramic acid (II) and bisulfite react slowly to give a mixture with 3-carboxy-2-sulfo-N,N-diallylpropionamide (VII) as the major product. The new sulfonated monomers (VI) and (VII) are stable to base but are hydrolyzed in acidic media.

THE REACTION OF ALLYL AMINE WITH MALEIC ANHYDRIDE

An equimolar amount of allylamine was allowed to react with maleic anhydride in tetrahydrofuran. During the amine addition, a precipitate formed which redissolved when the solution was heated to reflux. Upon cooling, crystals formed and were collected. The C-13 NMR spectrum is consistent with the expected product (VIII), and the proton spectrum is indicative of the maleamic acid isomer.

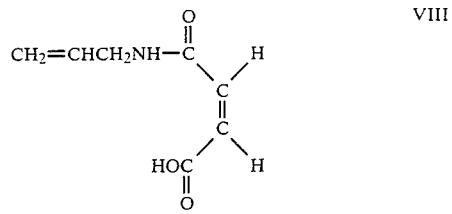

The reaction between VIII and sodium bisulfite was carried out in aqueous media. The reaction mixture cleared when warmed to 55° C. An IR of a recrystalized portion of the dried product shows the presence of carboxylic acid, carboxylic acid amide, and sulfonate absorptions. The carbon spectrum of a recrystalized portion of the product is consistent with Formula IX below. The large pH dependence of the aliphatic methine carbon signal indicates that the methine carbon is bonded to the carboxylic acid and the sulfonate as in Formula IX.

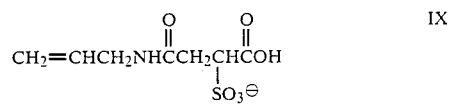

This sulfonate was heated neat in an oil bath at 165° C. for 10 hours. The IR spectrum exhibits absorptions at 1705 and 1775 cm$^{-1}$ indicative of imide formation (X).

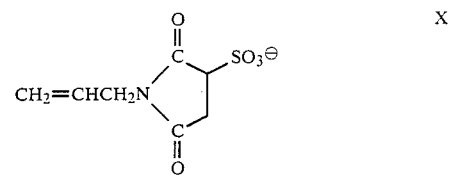

The disappearance of the secondary amide absorptions support the imide structure. The presence of the sulfonate is again readily apparent from the Infra-Red studies. The carbon spectrum shows the major signals as arising from the formation of the imide that possesses the same number of carbons as the starting material.

SUMMARY OF ALLYLAMINE-MALEIC ANHYDRIDE-BISULFITE REACTIONS

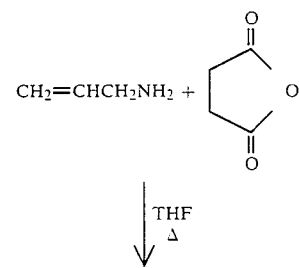

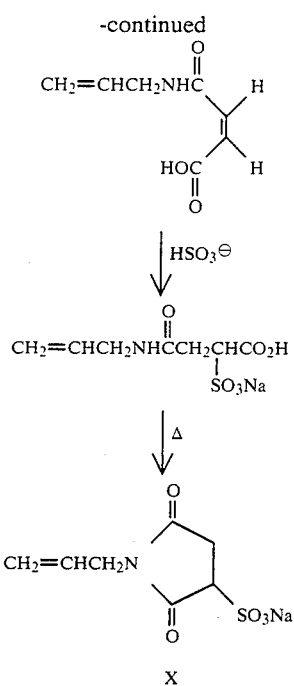

Allylamine reacts readily with maleic anhydride in THF to give N-allylmaleamic acid (VIII) in quantitative yield. VIII reacts with bisulfite in water to form 3-carboxy-3-sulfo-N-allyl propionamide (IX). At 160° C., (IX) cyclolyzes slowly to form N-allyl-sulfo-succinimide (X).

POLYMERIZATION OF THE ANIONIC MONOMERS OF THIS INVENTION

The anionic monomers of this invention may be polymerized to form either homopolymers, copolymers with other monomers of this invention, or copolymers with other water soluble vinyl monomers.

The homopolymers are derived preferably from free radical initiation of the monomers of this invention dissolved in any convenient solvent. For example, a homopolymer was formed by adding a free radical initiator, Vazo-50 (2,2'-Azobis (2-amidino-propane) Hydrochloride), to an aqueous solution of the 3-carboxy-3-sulfo-N,N-diallylpropionamide (VI) in a sealed vial under a nitrogen atmosphere. The polymerization solution had a pH of 6.6, the vial was sealed under nitrogen, and the vial was kept in an oven at 50°-60° C. for seven (7) days. The solution contents were monitored by Carbon-13 NMR which indicated the total disappearance of the allyl groups during the polymerization. Gel permeation chromatography showed that the average molecular weight of this homopolymer was about 16,400 with a dispersity factor of 2.2 (compared against polystyrene sulfonate as the standard).

In like manner, this same monomer can be charged with water into a resin kettle along with other water soluble vinyl monomers of this invention or with water soluble vinyl monomers chosen from the group consisting of acrylic acid, methacrylic acid, acrylamide, methacrylamide, styrene sulfonate, 2-acrylamido-2-methylpropane sulfonic acid (AMPS), sodium vinyl sulfonate, and diallyl dimethyl ammonium chloride. Addition of free radical catalysts under appropriate conditions would be expected to lead to copolymers.

The following copolymers and homopolymers have been made:

1. Poly(3-carboxy-3-sulfo-N,N-diallylpropionamide) 3-Carboxy-3-sulfo-N,N-diallylpropionamide (VI) (10 g), water (7 g) and V-50 (0.5 g) were charged into a 40 mL vial and sealed under nitrogen. The pH of the solution was 6.6 and the vial was sealed under nitrogen. The vial was kept in an oven at 50°-60° C. for seven (7) days. Carbon NMR of the solution showed the disappearance of the allyl groups. GPC showed the molecular weight average (Mw) of the polymers was 16,400 with a dispersity factor of 2.2 using polystyrene sulfonate as the standard.

2. VI (7.7 g), water (87 g) and V-50 (1 g) were charged into a 250 mL resin kettle. The pH of the solution was adjusted to 8.4, and the sample was heated to 50°-55° C. under nitrogen for 24 hours. Then 1 more gram of V-50 was added and heated to 70°-80° C. for 24 hours. GPC showed the molecular weight average of the polymers was 7010 with as dispersity factor of 1.6.

3. VI (6.8 g), acrylic acid (2.3 g) and water (84 g) were charged into a 250 mL resin kettle. The pH of the solution was adjusted to 8.4 with 50% NaOH. Under nitrogen, the reaction mixture was heated to 50°-55° C. and V-50 (1 g) was added. After maintaining at 50° C. for 24 hours. 1 gram of V-50 was added. The reaction temperature was raised to 75° C. and maintained there for 24 hours. GPC showed the molecular weight average of the polymers was 52,900 with a dispersity factor of 6.5.

4. Poly(3-Carboxy-3-sulfo-N-allylpropionamide) 3-Carboxy-3-sulfo-N-allylpropionamide (20 g), water (30 g), and V-50 (0.4 g) were charged into a 100 mL vial under nitrogen and kept in a 60° C. oven for seven (7) days. Carbon NMR analysis of the polymer solution showed the disappearance of the allyl groups. GPC showed the molecular weight average of the polymer was below 1000.

Having described the invention, we claim:

1. Water-soluble vinylic polymers derived from the free radical polymerization of an anionic monomer having the formula:

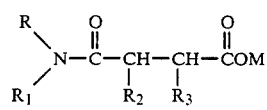

wherein:
M is hydrogen, lithium, sodium, potassium, ammonium, magnesium, or calcium, and mixtures thereof;
R is allyl;
$R_1$ is hydrogen or allyl;
$R_2$ is hydrogen or sulfonato;
$R_3$ is hydrogen or sulfonato; provided that $R_2$ is not the same as $R_3$.

2. The polymers of claim 1 wherein R is allyl, $R_1$ and $R_2$ are both hydrogen, $R_2$ is hydrogen, $R_3$ is sulfonato, and M is from the group consisting of hydrogen, lithium, sodium, potassium, ammonium, magnesium and calcium, or mixtures thereof.

3. The polymers of claim 1 wherein R and $R_1$ are both allyl, $R_2$ is hydrogen, and $R_3$ is sulfonato, and M is from the group hydrogen, lithium, sodium, potassium, ammonium, and mixtures thereof.

4. The polymers of claim 1 wherein R is allyl, $R_1$ is hydrogen, $R_2$ is sulfonato, $R_3$ is hydrogen, and each M is independently hydrogen, lithium, sodium, potassium, ammonium, and mixtures thereof.

5. The polymers of claim 1 wherein R and $R_1$ are both allyl, $R_2$ is sulfonato, $R_3$ is hydrogen, and each M is independently chosen from the group consisting of hydrogen, lithium, potassium, sodium, ammonium, calcium, magnesium, and mixtures thereof.

6. A water-soluble vinylic polymer derived from the free radical polymerization of an anionic monomer having the formula:

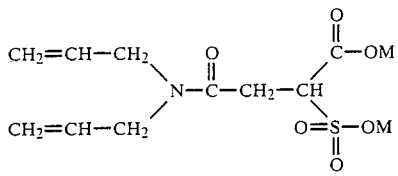

wherein each M is independently chosen from the group hydrogen, lithium, sodium, potassium, ammonium, and mixtures thereof.

7. A water-soluble vinylic polymer derived by the free radical polymerization of an anionic monomer having the formula:

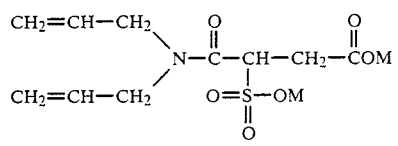

wherein each M is independently chosen from the group consisting of hydrogen, lithium, sodium, potassium, ammonium, and mixtures thereof.

8. A water-soluble vinylic polymer derived by the free radical polymerization of an anionic monomer having the formula:

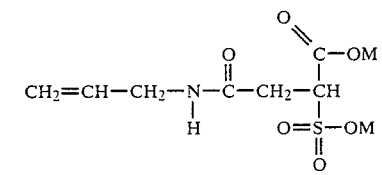

wherein each M is independently chosen from group consisting of hydrogen, lithium, sodium, potassium, ammonium, and mixtures thereof.

9. A water-soluble vinylic copolymer derived from the free radical polymerization of an anionic monomer having the formula:

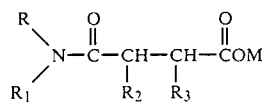

wherein:
M is hydrogen, lithium, sodium, potassium, ammonium, magnesium, calcium, or mixtures thereof;
R is allyl;
$R_1$ is hydrogen or allyl;
$R_2$ is hydrogen or sulfonato;
$R_3$ is hydrogen or sulfonato; provided that $R_2$ is not the same as $R_3$, in the presence of at least one water soluble vinyl monomer chosen from the group consisting of acrylic acid, acrylamide, methacrylic acid, methacrylamide, sulfonated styrene, 2-acrylamido-2-methylpropane sulfonic acid, sodium vinyl sulfonate, and diallyl dimethyl ammonium chloride.

10. A water-soluble vinylic copolymer derived from the free radical polymerization of an anionic monomer having the formula:

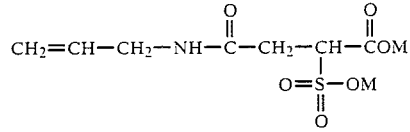

wherein each M is independently chosen from hydrogen, lithium, sodium, potassium, ammonium, and mixtures thereof, in the presence of at least one water-soluble vinyl monomer chosen from the group consisting of acrylic acid, methacrylic acid, acrylamide, methacrylamide, sulfonated styrene, 2-acrylamido-2-methylpropane sulfonic acid, sodium vinyl sulfonate, and diallyl dimethyl ammonium chloride.

11. A water-soluble vinylic copolymer derived by the free radical polymerization of an anionic monomer having the formula:

$$CH_2=CH-CH_2 \diagdown \atop CH_2=CH-CH_2 \diagup N-\underset{\underset{O}{\overset{\displaystyle O}{\|}}{\overset{\displaystyle O}{\|}}}{C}-\underset{O=S-OM \atop \overset{\|}{O}}{CH}-CH_2-\overset{O}{\underset{\|}{C}}-OM$$

wherein each M is independently chosen from the group consisting of hydrogen, lithium, sodium, potassium, ammonium, and mixtures thereof, in the presence of a water soluble vinyl monomer chosen from the group consisting of acrylic acid, methacrylic acid, acrylamide, methacrylamide, sulfonated styrene, 2-acrylamido-2-methylpropane sulfonic acid, sodium vinyl sulfonate, and diallyl dimethyl ammonium chloride.

12. A water-soluble vinylic copolymer derived by the free radical polymerization of an anionic monomer having the formula:

$$CH_2=CH-CH_2-NH-\overset{O}{\underset{\|}{C}}-CH_2-\underset{O=S-OM \atop \overset{\|}{O}}{CH}-\overset{O}{\underset{\|}{C}}OM$$

wherein each M is independently chosen from hydrogen, lithium, sodium, potassium, ammonium, and mixtures thereof, in the presence of a water soluble vinyl monomer chosen from the group consisting of acrylic acid, acrylamide, methacrylic acid, methacrylamide, sulfonated styrene, 2-acrylamido-2-methylpropane sulfonic acid, sodium vinyl sulfonate, and diallyl dimethyl ammonium chloride, or mixtures thereof.

* * * * *